United States Patent
Breese et al.

(10) Patent No.: US 7,891,178 B2
(45) Date of Patent: Feb. 22, 2011

(54) CENTRIFUGALLY BALANCED FLUID RESERVOIR AND METHOD OF USE THEREOF

(75) Inventors: Nick Jackson Breese, Owasso, OK (US); Charles Franklin Breese, Owasso, OK (US)

(73) Assignee: Nikco, LLC, Owasso, OK (US)

( * ) Notice: Subject to any disclaimer, the term of this patent is extended or adjusted under 35 U.S.C. 154(b) by 480 days.

(21) Appl. No.: 12/015,935

(22) Filed: Jan. 17, 2008

(65) Prior Publication Data
US 2009/0183964 A1 Jul. 23, 2009

(51) Int. Cl.
F16D 33/08 (2006.01)
(52) U.S. Cl. ........................................................ 60/357
(58) Field of Classification Search .................... 60/357
See application file for complete search history.

(56) References Cited

U.S. PATENT DOCUMENTS

| | | | | |
|---|---|---|---|---|
| 0,575,368 | A | | 1/1897 | Nolen, Jr. |
| 2,738,048 | A | * | 3/1956 | Douglas ........................ 60/357 |
| 3,320,748 | A | | 5/1967 | Nelden |
| 4,062,432 | A | | 12/1977 | Evans |
| 4,175,647 | A | * | 11/1979 | Hanke .......................... 60/357 |
| 4,312,433 | A | | 1/1982 | Bopp |
| 4,405,039 | A | | 9/1983 | Hauser |
| 4,488,628 | A | | 12/1984 | Kluna et al. |
| 4,544,053 | A | | 10/1985 | Yamaguchi et al. |
| 4,610,341 | A | | 9/1986 | Hauser et al. |
| 4,676,355 | A | | 6/1987 | Brunken et al. |
| 4,913,273 | A | | 4/1990 | Mader |
| 4,938,331 | A | | 7/1990 | Ohmi et al. |
| 5,119,921 | A | | 6/1992 | Drennen et al. |
| 5,558,192 | A | | 9/1996 | Muhlbach et al. |
| 5,722,523 | A | | 3/1998 | Martin |
| 5,775,115 | A | | 7/1998 | Lutz et al. |
| 5,803,221 | A | | 9/1998 | Kawada et al. |
| 6,176,783 | B1 | | 1/2001 | Lindsay et al. |

(Continued)

FOREIGN PATENT DOCUMENTS

DE 3714086 11/1988

(Continued)

*Primary Examiner*—F. Daniel Lopez
(74) *Attorney, Agent, or Firm*—Head, Johnson & Kachigian, P.C.

(57) ABSTRACT

A centrifugally balanced fluid reservoir comprising a fluid reservoir having a channel therein, a flexible barrier dividing the channel of the fluid reservoir into a first compartment and a second compartment, a first aperture in the first compartment allowing transfer of fluid into and out of the first compartment, and a second aperture in the second compartment allowing transfer of fluid into and out of the second compartment. The first aperture may fluidly connect the first compartment to an external pressure source, and the second aperture may fluidly connect the second compartment to a rotating device. The channel of the fluid reservoir may be toroidal and annular. The rotating device and the fluid reservoir may be coaxially and concentrically aligned and may be rotated together such that the amount of fluid in the rotating device is regulated by the balance of centrifugal forces on the fluid in the rotating device countered by the amount of fluid in the second compartment, which is a function of the amount of fluid in the first compartment, which may be regulated by the external pressure source.

22 Claims, 4 Drawing Sheets

U.S. PATENT DOCUMENTS

| | | |
|---|---|---|
| 6,752,251 B2 | 6/2004 | May et al. |
| 6,935,478 B2 | 8/2005 | Drager et al. |
| 2006/0243553 A1 | 11/2006 | Light et al. |
| 2006/0243554 A1 | 11/2006 | May |
| 2006/0243817 A1 | 11/2006 | Light et al. |

FOREIGN PATENT DOCUMENTS

| | | |
|---|---|---|
| DE | 19548065 | 6/1997 |
| GB | 601179 | 4/1948 |
| GB | 2145198 | 7/1984 |

* cited by examiner

CENTRIFUGALLY BALANCED FLUID RESERVOIR AND METHOD OF USE THEREOF

BACKGROUND OF THE INVENTION

1. Field of the Invention

This invention generally relates to a centrifugally balanced fluid reservoir and method of use thereof, and more particularly to a centrifugally balanced fluid reservoir that is self-contained, capable of rotation and that regulates the amount of fluid in a rotating device, such as a fluid coupling, viscous clutch, fan drive or other rotating device requiring varying amounts of fluid.

2. Description of Related Art

Fluid couplings and/or viscous clutches are commonly used as part of a rotating power transmission device, wherein the rate of rotation of the output shaft of the fluid coupling is dependant on the characteristics of the coupling, the rotational speed and the amount of fluid within the fluid coupling. The amount of fluid in the fluid coupling can be easily changed when the fluid coupling is not in operation, allowing the rate of rotation of the output shaft to be varied; however, known devices and methods varying the amount of fluid in the fluid coupling during operation are complex, expensive and require a significant amount of maintenance.

The function and use of fluid couplings in rotating power transmission is mature, well defined and widely known. Fluid couplings by design slip internally while shearing the fluid they contain between two semi-toroidal vaned halves, which allows the coupling to transmit torque since there is no mechanical connection between the input and output shafts of the coupling. In general, fluid couplings, for a given input rotational speed and torque transmitted, exhibit higher slip as the fluid level is reduced. Shearing the fluid inside the coupling generates heat in the fluid as a result of the work added to it. The fluid coupling is able to reject the heat generated at the design full load operating point by transferring heat from the coupling's body to the ambient air. This heat transfer is often enhanced by the external design of the coupling with some extended heat transfer surface cooled by the air flow over the coupling created by the spinning motion of the coupling during operation. In general, there is a practical limit to the allowable slip in a fluid coupling in a constant torque application due to the heat rejection to the fluid that results. If the slip and resulting fluid shear is too high, the resulting heat generation overheats the fluid in the coupling and the coupling fails. As a result, existing apparatus' for low fluid level/high slip applications of fluid couplings may consist of a mechanism to constantly exchange the fluid in the coupling via some mechanism to extract the fluid in the coupling and replacing it at the same rate with fresh cool fluid to maintain the desired fluid level within the coupling, thus providing a mechanism of carrying off the heat generated by the fluid shear in this high slip scenario. The hot fluid that is removed is typically cooled by some heat exchange mechanism and then returned to the coupling in a closed loop. The existing apparatus' for this scenario are typically large, complex, expensive, cumbersome, maintenance intensive and impractical for many applications.

It is possible to place a fluid coupling between a rotating power source and a other rotating device requiring varying amounts of fluid. In the case of other rotating device requiring varying amounts of fluids, the torque requirement at reduced speeds diminishes as the square of the reduction in speed. Consequently, the horsepower required diminishes as the cube of the reduction in speed. Using this fact, we have proven to our satisfaction that for It is therefore desirable to provide a centrifugally balanced fluid reservoir being properly sized and applied to a fluid coupling, viscous clutch or fan drive, wherein the heat rejected by a other rotating device requiring varying amounts of fluid to a fluid coupling in a low fluid level/high slip scenario is no more than is rejected in a full speed/full torque application.

It is further desirable to provide a centrifugally balanced fluid reservoir and method of use thereof that does not require an external heat transfer device to cool the fluid in the coupling, wherein the heat rejected to the ambient air is sufficient to maintain a suitable operating temperature for the coupling.

It is yet further desirable to provide a centrifugally balanced fluid reservoir wherein continuous fluid exchange is not required.

It is yet further desirable to provide a centrifugally balanced fluid reservoir that allows the transfer of fluid from the reservoir to the fluid coupling on an as needed basis, thus achieving a variable speed drive for the other rotating device requiring varying amounts of fluid.

It is yet further desirable to provide a centrifugally balanced fluid reservoir that permits removal of fluid from a rotating device by the centrifugal force inherent to a rotating object. The force created by the fluid in the rotating source is a function of the speed of rotation, the level of fluid in the source, and several other physical properties of the fluid itself.

It is yet further desirable to provide a centrifugally balanced fluid reservoir and method of use thereof whereby regulating the flow from the rotating source counteracts the centrifugal force by an opposing force. The fluid level in the rotating source will naturally seek a balance between the centrifugal force and the opposing force. The fluid in the source will flow into or out of the source until a balance of forces is reached, the source is either empty or full such that it can no longer supply or accept any additional fluid, or the reservoir is either empty or full such that it can no longer supply or accept any additional fluid.

It is yet further desirable to provide a centrifugally balanced fluid reservoir having a fluid reservoir with a variable internal pressure and resulting reservoir volume to modulate the level of fluid in the rotating source.

It is yet further desirable to provide a centrifugally balanced fluid reservoir that allows for easy change in the amount of fluid in a rotating device while the rotating device is in operation.

It is yet further desirable to provide a centrifugally balanced fluid reservoir capable of varying the amount of fluid in a rotating device, such as a fluid coupling, and therefore alter the rate of rotation produced by the rotating device, while the rotating device is in operation.

It is yet further desirable to provide a centrifugally balanced fluid reservoir and method of use thereof that is simple, inexpensive and low-maintenance.

It is yet further desirable to provide a centrifugally balanced fluid reservoir capable of regulating fluid transfer in rotating devices, such as fluid couplings, viscous clutches, fan drives and other rotating devices.

BRIEF SUMMARY OF THE INVENTION

In general, in a first aspect, the present invention relates to a centrifugally balanced fluid reservoir including a fluid reservoir having a channel therein, a flexible barrier dividing the channel of the fluid reservoir into a first compartment and a second compartment, a first aperture in the first compartment allowing transfer of fluid into and out of the first compartment, and a second aperture in the second compartment allowing transfer of fluid into and out of the second compartment. The fluid reservoir may be toroidal and annular. The flexible barrier may be sufficiently flexible to allow a volume of the first compartment and a volume of the second compartment to vary between 0% and 100% of the total volume of the channel of the fluid reservoir. The volume of the first compartment plus the volume of the second compartment can equal 100% of the total volume of the channel of the fluid reservoir.

The fluid reservoir may include a first member having an arcuate channel forming the first compartment releasably secured using a plurality of bolts to a second member having an arcuate channel forming the second compartment. The arcuate channel of the first member and the arcuate channel of the second member may form the channel of the fluid reservoir. The arcuate channel of the first member and the arcuate channel of the second member can be laterally divided by the flexible barrier forming the first compartment and the second compartment. The flexible barrier can be a flexible diaphragm or bladder made of a resilient, non-reactive polymer.

A first tubing may be in fluid communication with the first aperture and a second tubing may be in fluid communication with the second aperture. An external pressure source may be in fluid communication with the first aperture of the first compartment. A rotating device can be in fluid communication with the second aperture of the second compartment. The rotating device and the fluid reservoir may be coaxially and concentrically aligned. The fluid reservoir may be static or rotate. The rotating device may be a fluid coupling, viscous clutch, fan drive or other rotating device requiring varying amounts of fluid.

The rotating device may include an internal chamber with an outside radius and the channel of the fluid reservoir may have an inside radius. The inside radius of the channel of the fluid reservoir may be greater than the outside radius of the internal chamber of the rotating device.

In general, in a second aspect, the present invention relates to a method of regulating fluid transfer by rotating a centrifugally balanced fluid reservoir about an axis; regulating the amount of a first fluid in the first compartment with an external pressure source, wherein the external pressure source is in fluid communication with the first aperture in the first compartment; allowing a second fluid to transfer between the second compartment and a rotating device, wherein the rotating device is in fluid communication with the second aperture in the second compartment; and wherein the amount of the second fluid in the rotating device is dependent on the amount of the second fluid in the second compartment of the fluid reservoir, wherein the amount of the second fluid in the second compartment is dependent on the volume of the second compartment, wherein the volume of the second compartment is dependent on the position of the flexible barrier, wherein the position of the flexible barrier is dependent on the amount of the first fluid in the first compartment of the fluid reservoir, and wherein the amount of the first fluid in the first compartment is regulated by the external pressure source.

The method of regulating fluid transfer may further include rotating the rotating device to produce centrifugal force compelling the second fluid to transfer between the rotating device and the second compartment through the second aperture. The centrifugal force compelling the second fluid to transfer between the second compartment and the rotating device may be balanced by increasing the amount of the first fluid in the first compartment using the external pressure source in fluid communication with the first aperture in the first compartment of the fluid reservoir. The rotating device may be a fluid coupling, viscous clutch, fan drive or other rotating device requiring varying amounts of fluid. The method of regulating fluid transfer may further include the rotating device having an internal chamber with an outside radius, the channel of the fluid reservoir having an inside radius, and wherein the inside radius of the channel of the fluid reservoir is greater than the outside radius of the internal chamber of the rotating device. The channel of the fluid reservoir may be toroidal and annular, while the rotating device and the fluid reservoir may be coaxially and concentrically aligned.

Other advantages and features will be apparent from the following description and from the claims.

DETAILED DESCRIPTION OF THE PREFERRED EMBODIMENTS

The devices and methods discussed herein are merely illustrative of specific manners in which to make and use the invention and are not to be interpreted as limiting in scope.

While the devices and methods have been described with a certain degree of particularity, it is to be noted that many modifications may be made in the details of the construction and the arrangement of the devices, methods and components without departing from the spirit and scope of this disclosure. It is understood that the devices and methods are not limited to the embodiments set forth herein for purposes of exemplification.

Figure 1:
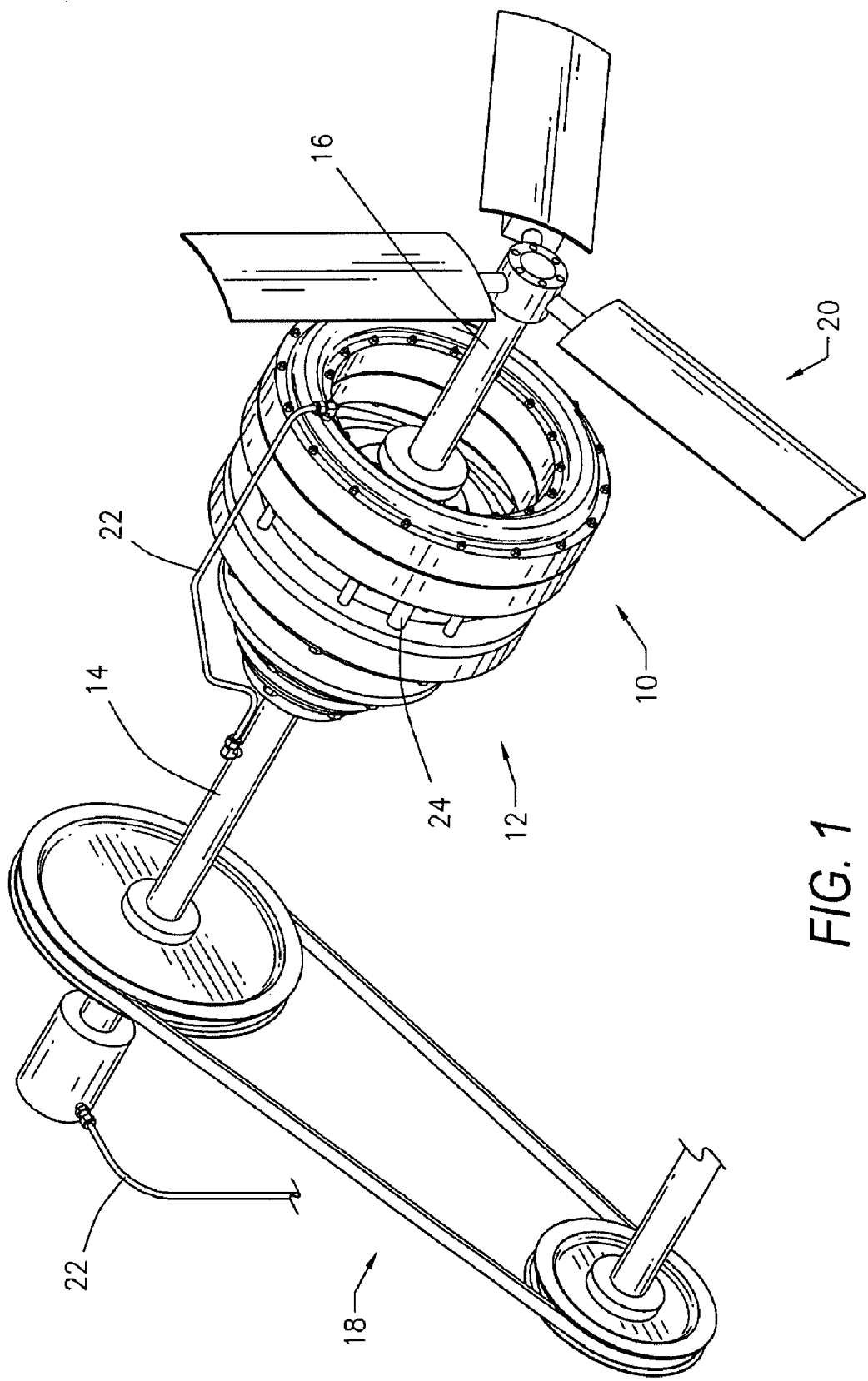
FIG. 1 is a perspective view of an example of a centrifugally balanced fluid reservoir in accordance with an illustrative embodiment of the centrifugally balanced fluid reservoir disclosed herein.
Figure 2:
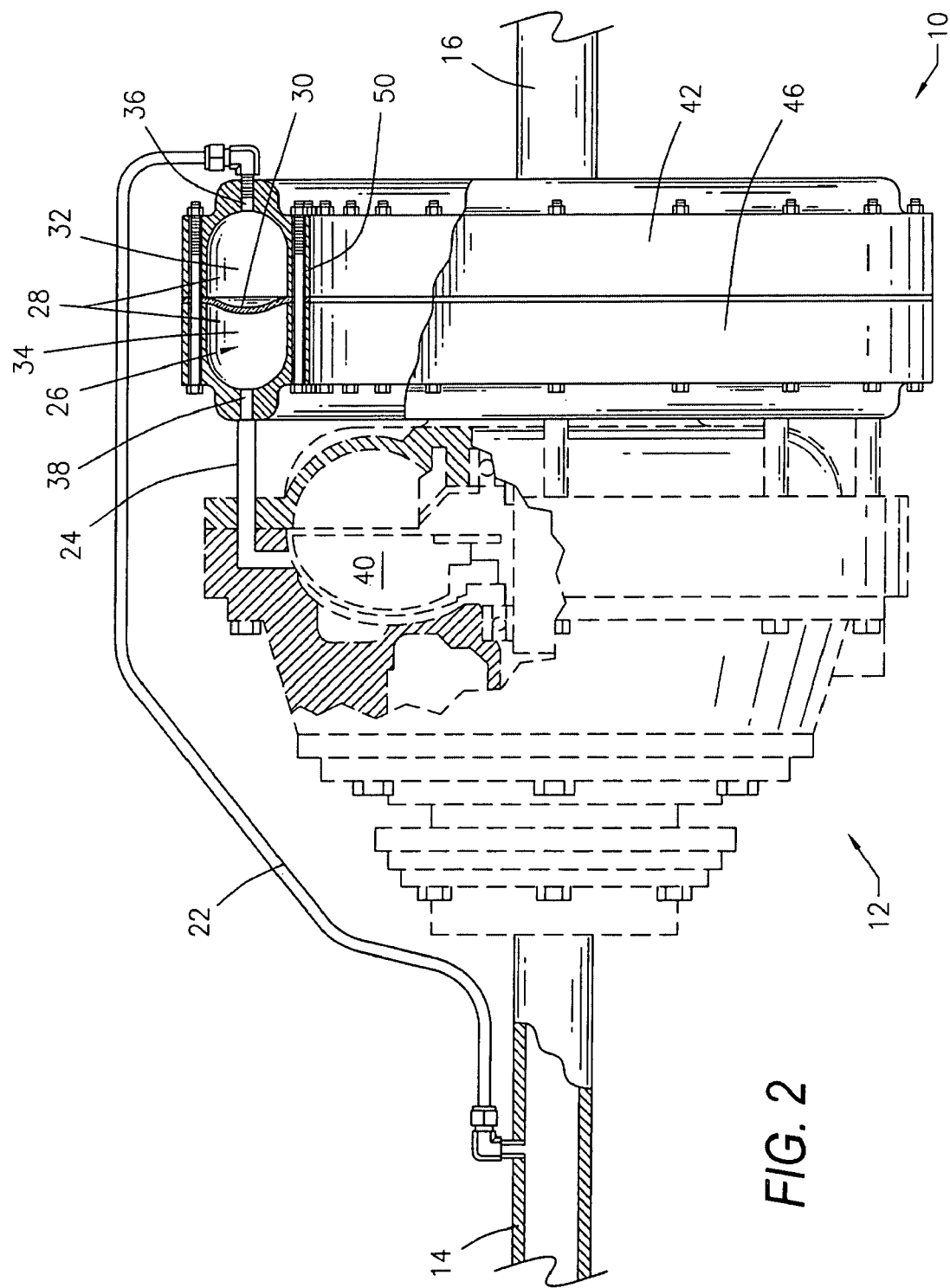
FIG. 2 is a schematic side view of an example of a centrifugally balanced fluid reservoir in accordance with the illustrative embodiment of FIG. 1.

Referring to the figures of the drawings, wherein like numerals of reference designate like elements throughout the several views, and initially to FIG. 1, a centrifugally balanced fluid reservoir 10 that is pressurized and in fluid communication with a rotating device 12. The rotating device 12 may be a fluid coupling, as shown for purposes of illustration, a viscous clutch, a fan drive, other rotating device requiring varying amounts of fluid or any other rotating device requiring a varying amount of fluid. The rotating device 12 may be connected to an input shaft 14 and an output shaft 16. The input shaft 14 may be connected to a power source 18 that causes the input shaft 14 to rotate. The output shaft 16, as shown in FIG. 1, is connected to a fan 20. The input shaft 14 rotates the rotating device 12, which has internal slippage while shearing a contained fluid between semi-toroidal vaned halves, allowing the rotating device 12 to transmit torque to the output shaft 16 to turn the fan 20. As illustrated in FIGS. 1 and 2, the centrifugally balanced fluid reservoir 10 may include a first tube 22 in fluid communication with an external pressure source (not shown), such as instrument air. The centrifugally balanced fluid reservoir may also include a second tube 24 in fluid communication with the rotating device 12, permitting fluid transfer between the rotating device 12 and the centrifugally balanced fluid reservoir 10. By varying the pressure and volume within the centrifugally balanced fluid reservoir 10 by the external pressure source, the volume of fluid in the centrifugally balanced fluid reservoir 10 and in the rotating device 12 is increased or decreased, thus increasing or decreasing the slippage in the rotating device 12. This increase or decrease in slippage in the rotating device 12 alters the torque output to output shaft 16. Therefore, the centrifugally balanced fluid reservoir 10 has a variable internal pressure and resulting reservoir volume to modulate the level of fluid in the rotating source 12.

Figure 3:
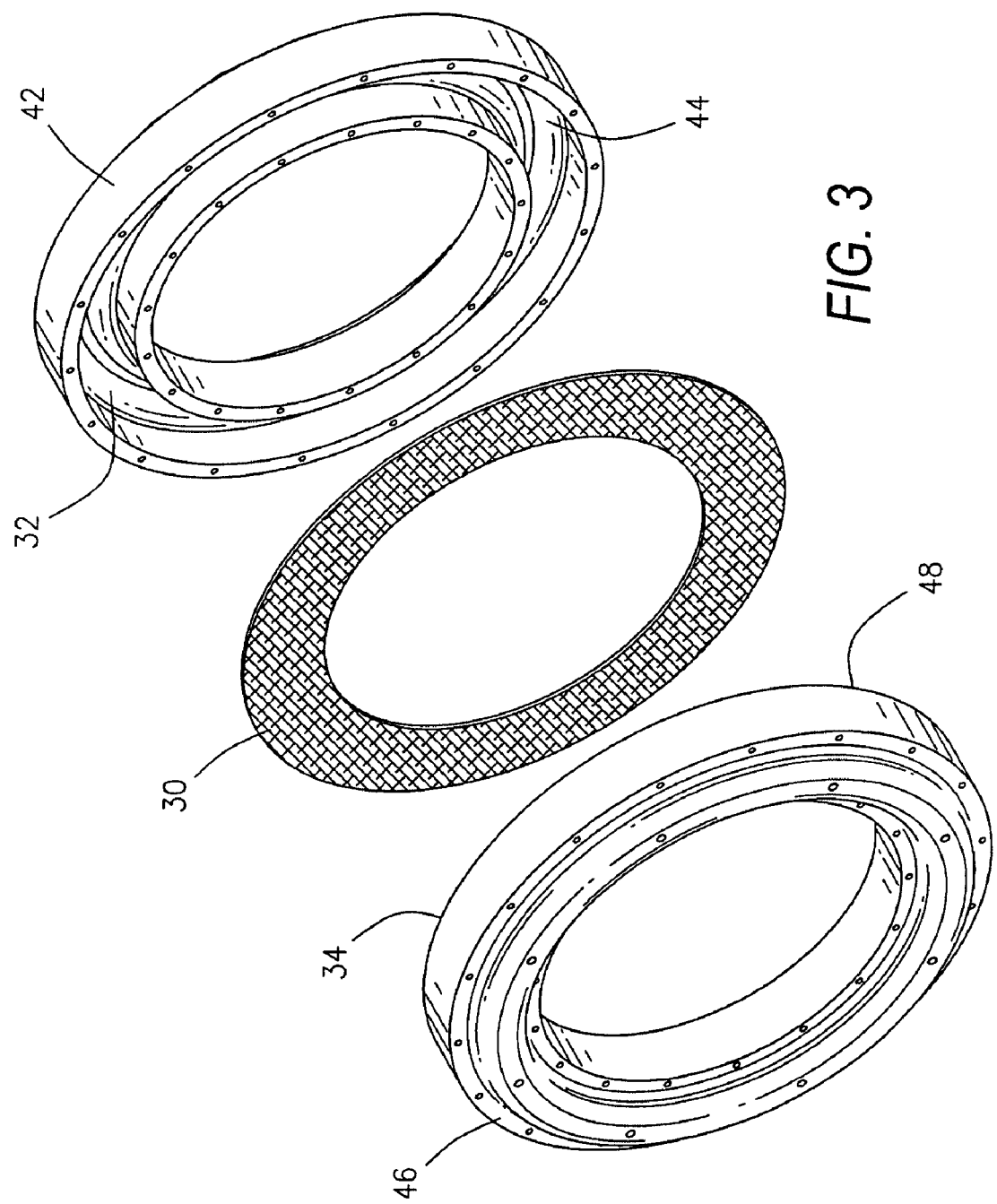
FIG. 3 is an exploded perspective view of an example of a centrifugally balanced fluid reservoir in accordance with the illustrative embodiment of FIGS. 1 and 2.
Figure 4:
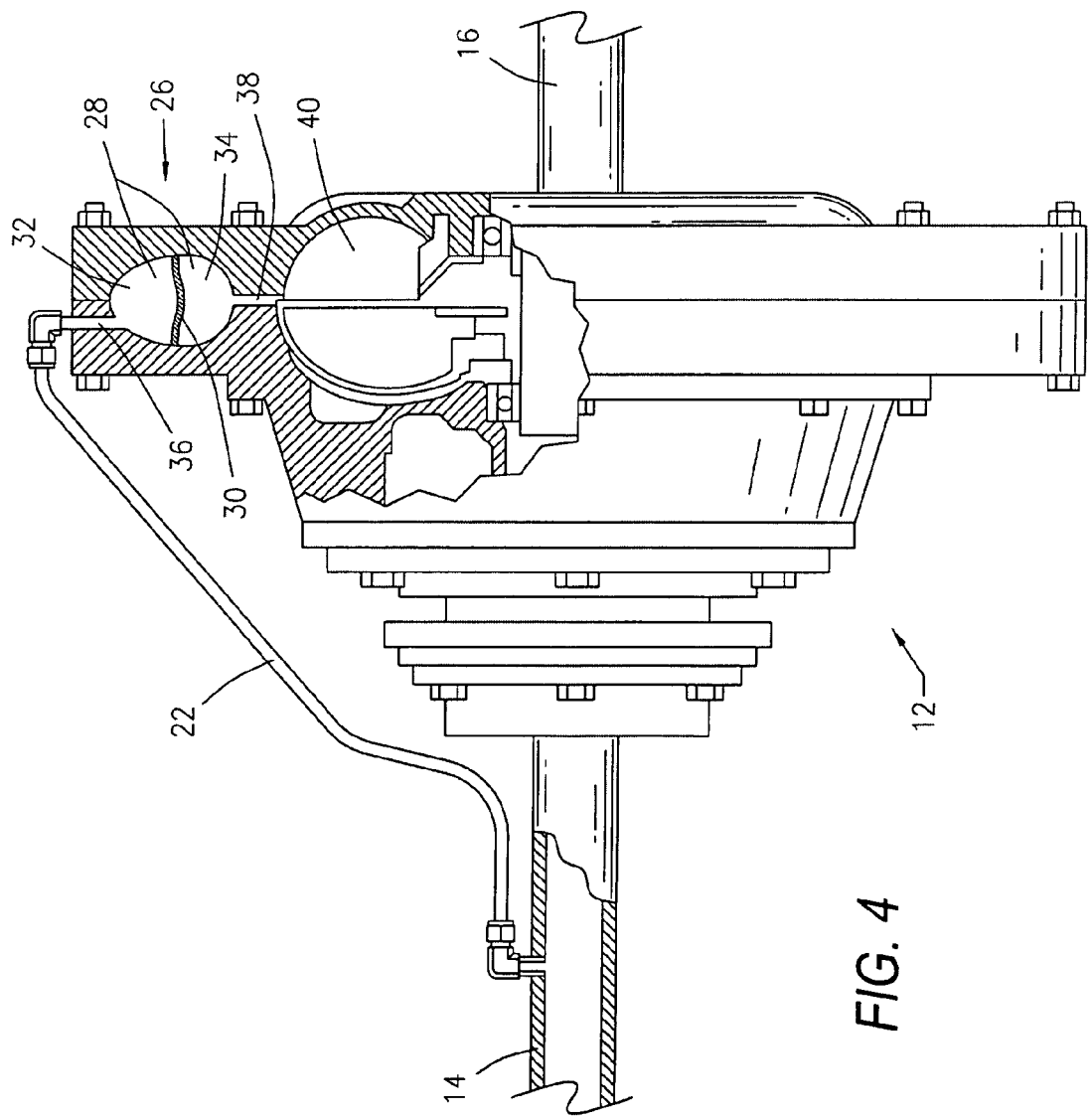
FIG. 4 is a schematic side view of another example of a centrifugally balanced fluid reservoir in accordance with an illustrative embodiment of the centrifugally balanced fluid reservoir disclosed herein.

The centrifugally balanced fluid reservoir 10 includes a fluid reservoir 26 having a channel 28 therein. A flexible barrier 30 divides the channel 28 of the fluid reservoir 26 into a first compartment 32 and a second compartment 34. The channel 28 of the fluid reservoir 26 may be toroidal and annular, as shown in FIG. 3. The fluid reservoir 26 may have a volume equal to the greatest volume in a rotating device 12 minus the least desired volume in the rotating device 12. The fluid reservoir 26 may be attached to the rotating device 12, as shown in FIG. 2, or made be integrated therewith, as shown in FIG. 4. The flexible barrier 30 may be sufficiently flexible to allow the volumes of the first and second compartments 32 and 34 of the fluid reservoir 12 to vary between 0% and 100% of the total fluid reservoir volume. The flexible barrier 30 may be a flexible diaphragm or bladder and may be made of a resilient, non-reactive polymer material. The relative pressures of the first and second compartments 32 and 34 and the resulting flexible barrier 30 deflection, or, when a diaphragm is used, the position of the diaphragm, determine the first and second compartment 32 and 34 volumes, respectively. The level of fluid in the first and second compartments 32 and 34 of the fluid reservoir 26 is modulated by balancing the fluid pressure in the second compartment 34 created by the centrifugal force of the rotating device 12 against a counteracting pressure in the first compartment 32 created by the external pressure source on the opposite side of the flexible barrier 30. The fluid reservoir 26 may be stationary or may rotate. The fluid reservoir 26 may rotate independently of the rotating device 12 or may rotate at the same rate of rotation as the rotating device 12. The fluid reservoir 26 and the rotating device 12 may be coaxially and concentrically aligned.

The first compartment 32 of the fluid reservoir 26 of the centrifugally balanced fluid reservoir 10 has a first aperture 36 allowing the transfer of fluid into and out of the first compartment 32. The first aperture 36 of the first compartment 32 may be directly in fluid communication with the external pressure source or may be fluidly connected to the external pressure source via the first tube 22. The second compartment 34 of the fluid reservoir 26 of the centrifugally balanced fluid reservoir has a second aperture 38 allowing the transfer of fluid into and out of the second compartment 34. The second aperture 38 of the second compartment may be directly in fluid communication with the rotating device 12 or may be fluidly connected to the rotating device 12 via the second tube 24. The volume of the first compartment 32 plus the volume of the second compartment 34 equals 100% of the total volume of the channel 28 of the fluid reservoir 26.

The rotating device 12 may include an internal chamber 40 with an outside radius less than an inside radius of the channel 28 of the fluid reservoir 26.

The centrifugally balanced fluid reservoir 10 may include a first member 42 having an arcuate channel 44, which forms the first compartment 32 of the fluid reservoir 26. The centrifugally balanced fluid reservoir 10 may also include a second member 46 having an arcuate channel 48, which forms the second compartment 34 of the fluid reservoir 26. The arcuate channel 44 of the first member 42 and the arcuate channel 48 of the second member 46 may be laterally divided by the flexible barrier 30 and may form the channel 28 of the fluid reservoir 26. The first member 42 may be secured to the second member 46 may be secured together by a plurality of bolts 50 or other fastening mechanisms.

The centrigually balanced fluid reservoir 10 may be separated from the rotating device 12 as illustrated in FIGS. 1 and 2, or may be integrated into the rotating device 12, as illustrated in FIG. 4. In keeping with the spirit and scope of the centrifugally balanced fluid reservoir 10 disclosed herein, one skilled in the art will appreciate that any configuration of the first and second compartments 32 and 34 in the fluid reservoir 26 is acceptable, so long as the minor diameter of the first and second compartments 32 and 34 is greater than the major diameter of the internal chamber 40 the rotating device 12.

As the rotating device 12 is rotated, fluid in the internal chamber 40 of the rotating device 12 is subjected to centrifugal force. Because the inner diameter of the fluid reservoir 26 of the centrifugally balanced fluid reservoir 10 is greater than the outer diameter of the internal chamber 40 of the rotating device 12, and if the centrifugal force is greater than the force of the pressure in the second compartment 34, the centrifugal force causes the fluid in the internal chamber 40 of the rotating device 12 to travel from the rotating device 12, through the second aperture 38 (and possibly through the second tube 24 depending upon the configuration), and into the second compartment 34. This causes the flexible barrier 30 to deflect, increasing the volume of the second compartment 34 and decreasing the volume of the first compartment 32. The external pressure source may be used to transfer fluid through the first aperture 36 (and possibly through the first tube 22 depending upon the configuration) into the first compartment 32, thus increasing the pressure and the volume of the first compartment 32 and decreasing the volume of the second compartment 34 through the deflection of the flexible barrier 30. As the second compartment 34 can no longer hold as much fluid, fluid travels from the second compartment 34, through the second aperture 38, and into the rotating device 12, counterbalancing the centrifugal force created by rotation of the rotating device 12. Thus, altering the pressure exerted by the external pressure source alters the amount of fluid in the internal chamber 40 of the rotating device 12.

The centrifugally balanced fluid reservoir 10 may be used to vary the fluid level in any rotating device 12, such as a fluid coupling, viscous clutch, fan drive or other rotating device requiring varying amounts of fluid. If the level of fluid (typically oil) in the rotating device 12 is varied, the power transmission characteristics vary accordingly. The final result and desired effect is a variable speed control for the output shaft 16 of the rotating device. For a constant input rotation speed, a change in the pressure of the flexible barrier 30 in the channel 28 of the fluid reservoir 26 would result in a change in output speed of the rotating device for a given power requirement.

The centrifugally balanced fluid reservoir 12 allows the output speed to be changed while the rotating device 12 is operational by changing the amount of fluid in the rotating device 12. The centrifugal force inherent in the operation of the rotating device 12 allows for removal of fluid from the rotating device 12, and the pressure exerted by the flexible barrier 30 on the fluid in the second compartment 34 due to the amount of fluid in the first compartment 32, which is controlled by the external pressure source, allows for the variation of fluid to the rotating device 12. In other words, the pressure balance in the centrifugally balanced fluid reservoir 10 determines the fluid level in the rotating device 12. Thus, the amount of fluid in the rotating device 12 may be regulated by changing the amount of pressure exerted by the external pressure source. Due to the inherent operational characteristics of the rotating device 12, this self-contained, pressurized, centrifugally balanced fluid reservoir 10 is particularly well suited to any rotating device 12 whose function is enhanced by a variable fluid level. Due to the inherent characteristics of the rotating device 12, it is possible to vary the speed of the output shaft 16 by varying the amount of fluid in the internal chamber 40 of the rotating device 12.

Also contemplated herein is a method of regulating fluid transfer by rotating the centrifugally balanced fluid reservoir 10 about an axis (fully discussed above), regulating the amount of a first fluid in the first compartment 32 with the external pressure source and allowing a second fluid to transfer between the second compartment 34 and the rotating device 12. The rotating device 12 is in fluid communication with the second aperture 38 in the second compartment 34, while the external pressure source is in fluid communication with the first aperture 36 in the first compartment 32. The amount of the second fluid in the rotating device 12 is dependent on the amount of the second fluid in the second compartment 34 of the fluid reservoir 12. The amount of the second fluid in the second compartment 34 is dependent on the volume of the second compartment, and the volume of the second compartment 34 is dependent on the position of the flexible barrier 30. The position of the flexible barrier 30 is dependent on the amount of the first fluid in the first compartment 32 of said fluid reservoir 26. The amount of the first fluid in the first compartment 32 is regulated by the external pressure source.

The method of regulating fluid transfer may also include rotating the rotating device 12 to produce centrifugal force compelling the second fluid to transfer between the internal chamber 40 of the rotating device 12 and the second compartment 34 through the second aperture 38. The centrifugal force compelling the second fluid to transfer between the second compartment 34 and the internal chamber 40 of the rotating device 12 is balanced by increasing the amount of the first fluid in the first compartment 32 using the external pressure source, which is in fluid communication with the first aperture 36 in the first compartment 32 of said fluid reservoir 26.

As described in the foregoing, the rotating device 12 may be a fluid coupling, viscous clutch, fan drive or other rotating device requiring varying amounts of fluid. The rotating device 12 may have the internal chamber 40 with an outside radius, and the channel 28 of the fluid reservoir 26 may have an inside radius. The inside radius of the channel 28 of the fluid reservoir 26 should be greater than the outside radius of the internal chamber 40 of the rotating device 12. The channel 28 of the fluid reservoir 26 of the centrifugally balanced fluid reservoir 10 may be toroidal and annular, and the rotating device 12 and the centrifugally balanced fluid reservoir 10 may be coaxially and concentrically aligned.

Whereas, the devices and methods have been described in relation to the drawings and claims, it should be understood that other and further modifications, apart from those shown or suggested herein, may be made within the spirit and scope of this invention.

What is claimed is:

1. A centrifugally balanced fluid reservoir, comprising:
  a fluid reservoir having a toroidal channel therein, said fluid reservoir further comprising a first member having a generally arcuate channel forming a first compartment and a second member having a generally arcuate channel forming a second compartment, wherein said arcuate channel of said first member and said arcuate channel of said second member form said channel of said fluid reservoir;
  a flexible barrier dividing said channel of said fluid reservoir into said first compartment and said second compartment;
  a first aperture in said first compartment allowing transfer of fluid into and out of said first compartment; and
  a second aperture in said second compartment allowing transfer of fluid into and out of said second compartment.

2. The centrifugally balanced fluid reservoir of claim 1 wherein said fluid reservoir further comprises said first member having said generally arcuate channel forming said first compartment releasably secured using a plurality of bolts to said second member having said generally arcuate channel forming said second compartment.

3. The centrifugally balanced fluid reservoir of claim 2 wherein said arcuate channel of said first member and said arcuate channel of said second member are laterally divided by said flexible barrier forming said first compartment and said second compartment.

4. The centrifugally balanced fluid reservoir of claim 1 wherein said flexible barrier is sufficiently flexible to allow a volume of said first compartment and a volume of said second compartment to vary between 0% and 100% of the total volume of said channel of said fluid reservoir, and wherein said volume of said first compartment plus said volume of said second compartment equals 100% of the total volume of said channel of said fluid reservoir.

5. The centrifugally balanced fluid reservoir of claim 1 further comprising a first tubing in fluid communication with said first aperture and a second tubing in fluid communication with said second aperture.

6. The centrifugally balanced fluid reservoir of claim 1 further comprising an external pressure source in fluid communication with said first aperture of said first compartment.

7. The centrifugally balanced fluid reservoir of claim 1 further comprising a rotating device in fluid communication with said second aperture of said second compartment.

8. The centrifugally balanced fluid reservoir of claim 7 wherein said rotating device and said fluid reservoir are coaxially aligned.

9. The centrifugally balanced fluid reservoir of claim 7 wherein said fluid reservoir is static or rotates.

10. The centrifugally balanced fluid reservoir of claim 7 further comprising:
  said rotating device having an internal chamber with an outside radius;
  said channel of said fluid reservoir having an inside radius; and
  wherein said inside radius of said channel of said fluid reservoir is greater than said outside radius of said internal chamber of said rotating device.

11. The centrifugally balanced fluid reservoir of claim 7 wherein said rotating device is a fluid coupling, viscous clutch, fan drive or other rotating device requiring varying amounts of fluid.

12. The centrifugally balanced fluid reservoir of claim 1 wherein said flexible barrier is a flexible diaphragm or bladder comprised of a resilient, non-reactive polymer.

13. A centrifugally balanced fluid reservoir, comprising:
  a fluid reservoir having a toroidal channel therein, said toroidal channel of said fluid reservoir comprising a first generally arcuate channel secured to a second generally arcuate channel;

a flexible barrier laterally dividing said first generally arcuate channel and said second generally arcuate channel of said toroidal channel of said fluid reservoir into a first compartment and a second compartment;

a first aperture in said first compartment in fluid communication with an external pressure source;

a second aperture in said second compartment in fluid communication with a rotating device;

wherein said rotating device and said fluid reservoir are coaxially aligned;

wherein said rotating device has an internal chamber with an outside radius, said channel of said fluid reservoir has an inside radius, and wherein said inside radius of said channel of said fluid reservoir is greater than said outside radius of said internal chamber of said rotating device.

14. The centrifugally balanced fluid reservoir of claim 13 wherein said flexible barrier is sufficiently flexible to allow a volume of said first compartment and a volume of said second compartment to vary between 0% and 100% of the total volume of said channel of said fluid reservoir, and wherein said volume of said first compartment plus said volume of said second compartment equals 100% of the total volume of said channel of said fluid reservoir.

15. The centrifugally balanced fluid reservoir of claim 13 wherein said fluid reservoir is static or rotates.

16. The centrifugally balanced fluid reservoir of claim 13 wherein said rotating device is a fluid coupling, viscous clutch, fan drive or other rotating device requiring varying amounts of fluid.

17. A method of regulating fluid transfer, comprising the steps of:

rotating a centrifugally balanced fluid reservoir about an axis, wherein said centrifugally balanced fluid reservoir comprises:

a fluid reservoir having a toroidal channel therein, wherein said fluid reservoir further comprises a first member having a generally arcuate channel forming a first compartment secured to a second member having a generally arcuate channel forming a second compartment, wherein said generally arcuate channel of said first member and said generally arcuate channel of said second member form said toroidal channel of said fluid reservoir;

a flexible barrier laterally dividing said toroidal channel of said fluid reservoir into said first compartment and said second compartment;

a first aperture in said first compartment allowing transfer of a first fluid into and out of said first compartment; and a second aperture in said second compartment allowing transfer of a second fluid into and out of said second compartment;

regulating the amount of said first fluid in said first compartment with an external pressure source, wherein said external pressure source is in fluid communication with said first aperture in said first compartment;

allowing said second fluid to transfer between said second compartment and a rotating device, wherein said rotating device is in fluid communication with said second aperture in said second compartment; and wherein the amount of said second fluid in said rotating device is dependent on the amount of said second fluid in said second compartment of said fluid reservoir, wherein the amount of said second fluid in said second compartment is dependent on the volume of said second compartment, wherein said volume of said second compartment is dependent on the position of said flexible barrier, wherein said position of said flexible barrier is dependent on the amount of said first fluid in said first compartment of said fluid reservoir, and wherein said amount of said first fluid in said first compartment is regulated by said external pressure source.

18. The method of regulating fluid transfer of claim 17 further comprising the step of rotating said rotating device to produce centrifugal force compelling said second fluid to transfer between said rotating device and said second compartment through said second aperture.

19. The method of regulating fluid transfer of claim 18 wherein said centrifugal force compelling said second fluid to transfer between said second compartment and said rotating device is balanced by increasing said amount of said first fluid in said first compartment using said external pressure source in fluid communication with said first aperture in said first compartment of said fluid reservoir.

20. The method of regulating fluid transfer of claim 17 where said rotating device is a fluid coupling, viscous clutch, fan drive or other rotating device requiring varying amounts of fluid.

21. The method of regulating fluid transfer of claim 17 further comprising:

said rotating device having an internal chamber with an outside radius;

said channel of said fluid reservoir having an inside radius; and wherein said inside radius of said channel of said fluid reservoir is greater than said outside radius of said internal chamber of said rotating device.

22. The method of regulating fluid transfer of claim 17 wherein said rotating device and said fluid reservoir are coaxially aligned.

* * * * *